Patented Feb. 11, 1930

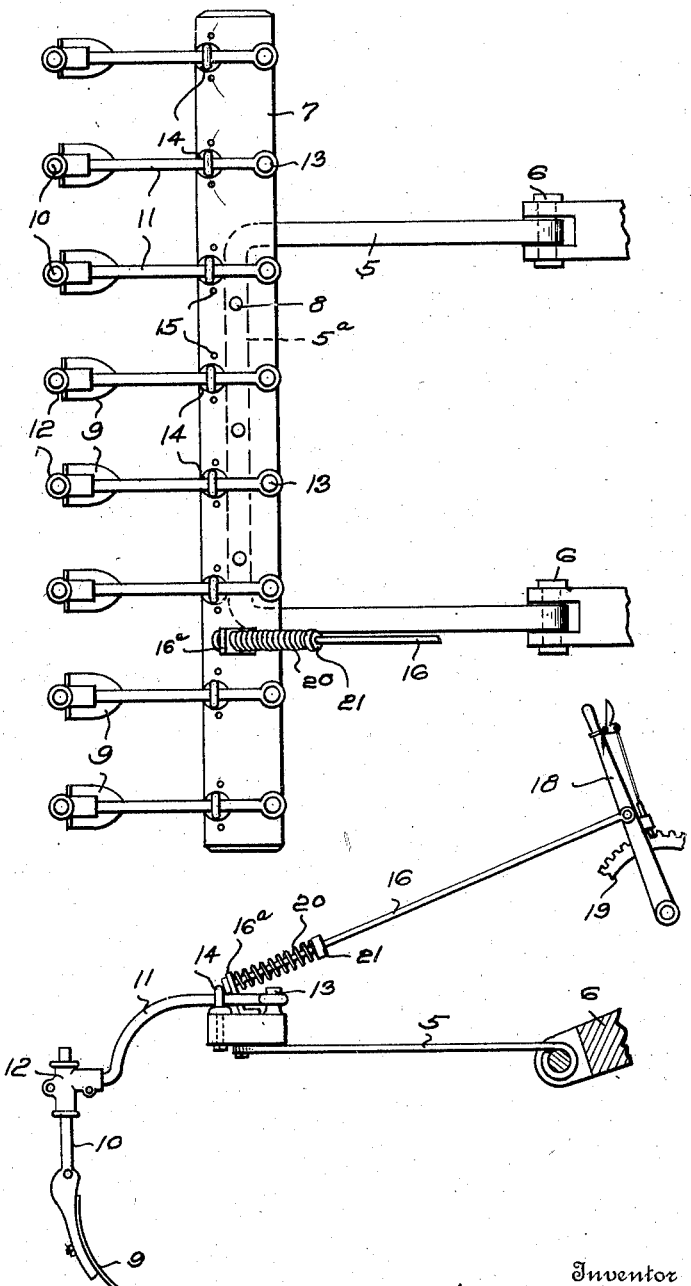

1,746,606

UNITED STATES PATENT OFFICE

BERT RAY, OF ORAL, SOUTH DAKOTA

TRACTOR DRAWBAR CULTIVATOR

Application filed November 7, 1928. Serial No. 317,756.

This invention relates to a tractor drawbar cultivator, or, in other words, to a cultivator that is attached directly to, and carried by, the drawbar of a tractor instead of being mounted upon a wholly separate wheeled frame, and the object of this invention is to produce an easily controlled device of this character, constructed in such manner that it may be manufactured at a small fraction of the cost of ordinary tractor drawn cultivators.

Further objects and advantages of the invention will be set forth in the detailed description which follows:

In the accompanying drawing:

Fig. 1 is a plan view and

Fig. 2 a longitudinal sectional view of a device constructed in accordance with the invention.

Like numerals designate corresponding parts in all of the figures of the drawing.

A known type of tractor utilizes a drawbar, consisting of a U-shaped frame 5, which is pivotally engaged with an element of the tractor, indicated at 6. In carrying out the invention, I mount a beam 7 upon the transverse member 5ª of the drawbar. The beam is secured upon the drawbar by bolts 8. The plows or shovels 9, of the cultivator, are carried by shanks 10, and these shanks may be rendered adjustable, with respect to the arms or standards 11, by means of adjusting clamps 12, of a usual and well known construction. The standards 11 are secured to the beam 7, by bolts 13 and 14, and the bolts 14 are adapted to take into any one of a plurality of holes 15, that are disposed in concentric relation to the pivot point constituted by the bolt 13, of any given standard. By virtue of this construction, it is possible to set the plows 9 at varying angles with respect to the line of travel of the machine, or to set said plows closer together, or farther apart, as may be desired. The beam 7 carries an upstanding eye 16ª, through which a pull rod 16 passes. An operating lever 18 and its associated ratchet bar 19, such as is common in agricultural machinery, provides means for lifting the beam through the medium of the pull rod and its associated parts. A spring 20 bears between the eye 16ª and a collar 21, on the rod 16; said spring permitting limited rise and fall, with a consequent cushioning of the beam and its associated parts, during the passage of the cultivator over inequalities of the surface of the ground. The length of the beam 7 may vary with the number of rows to be cultivated in a single operation, and it is to be understood that the invention is not limited to any particular number of cultivating elements. I prefer to employ four cultivator plows between each two rows of corn, and it is to be understood that the invention is not limited with respect to the particular type of plow employed. It is clear that to those skilled in the art the substitution of disc plows for the structure illustrated will be a mere matter of choice, and that the particular disposition of the plows with respect to the beam will also be a matter of choice, in so far as placing the plows in the same transverse plane or staggering them in accordance with well known practice, is concerned.

Further, the particular manner of securing the plows to the beam 7 may be varied within wide ranges without departing from the basic principle involved, namely, that of securing a rigid beam of this nature directly to the transverse member 5ª of a conventional tractor drawbar.

It is to be understood that the invention is not limited to the precise construction set forth, but that it includes, within its purview, whatever changes fairly come within either the terms or the spirit of the appended claims.

Having described my invention, what I claim is:

1. A device of the character described, comprising a tractor drawbar, consisting of a U-shaped frame, a beam bolted directly to the transverse member of said frame, a plurality of standards pivoted upon the upper face of said beam and extending downwardly at their rear ends, a tillage element carried by said standards, and means for adjusting said standards across the face of the beam to vary the angularity of said standards with respect to the line of travel of the device.

2. A device of the character described, comprising a tractor drawbar consisting of a U-shaped frame, a beam secured directly to the transverse element of the U-shaped frame, to be disposed transversely of the line of travel, a plurality of standards pivoted at their forward ends on the upper face of said beam, and provided rearwardly of said pivot point with bolts arranged to take into any one of a plurality of openings disposed in concentric relation to the pivot point of the standard, and a tillage element supported from said standards.

In testimony whereof he affixes his signature.

BERT RAY.